United States Patent [19]

Longuemare, Jr.

[11] 4,161,732
[45] Jul. 17, 1979

[54] GATED PULSE COMPRESSION RADAR

[75] Inventor: R. Noel Longuemare, Jr., Ellicott City, Md.

[73] Assignee: Westinghouse Electric Corp., Pittsburgh, Pa.

[21] Appl. No.: 741,439

[22] Filed: Nov. 12, 1976

[51] Int. Cl.² ............................................. G01S 9/233
[52] U.S. Cl. ....................... 343/17.2 PC; 343/17.1 PF
[58] Field of Search .................... 343/17.2 PC, 17.1 PF

[56] References Cited

U.S. PATENT DOCUMENTS

| | | | |
|---|---|---|---|
| 2,427,523 | 9/1947 | Dolberg et al. | 343/17.1 R |
| 3,460,141 | 8/1969 | Bouman | 343/17.2 PC |
| 3,679,983 | 7/1972 | Theriot | 343/17.2 PC X |
| 3,747,099 | 7/1973 | Wong | 343/17.2 PC |
| 3,766,477 | 10/1973 | Cook | 343/17.2 PC X |
| 3,815,133 | 6/1974 | Yasusaka et al. | 343/17.1 PF X |

FOREIGN PATENT DOCUMENTS 1095842 12/1967 United Kingdom ............. 343/17.2 PC

OTHER PUBLICATIONS

"Radar Handbook" by M. I. Skolnik, 1970, McGraw-Hill Book Company, pp. 29-14 through 29-23.

Primary Examiner—Malcolm F. Hubler
Attorney, Agent, or Firm—R. M. Trepp

[57] ABSTRACT

A pulse compression coherent radar for obtaining target information is described wherein a pulse compression waveform having a predetermined bandwidth is gated at a frequency greater than the predetermined bandwidth to form a sequence of spaced apart pulses which are transmitted towards a target. A sequence of target reflected pulses are received during predetermined time intervals. The target reflected pulses of the sequence are compressed and then filtered to extract predetermined frequency components of the compressed signal. Alternatively, the target reflected pulses of the sequence are first filtered to extract predetermined frequency components and then compressed. In either embodiment, the output signal contains target doppler frequency and phase, range, and amplitude signature information. The gated pulse compression waveform may be for example a chirp or linear FM signal, phase coded signal, or pseudo noise coded signal.

18 Claims, 13 Drawing Figures

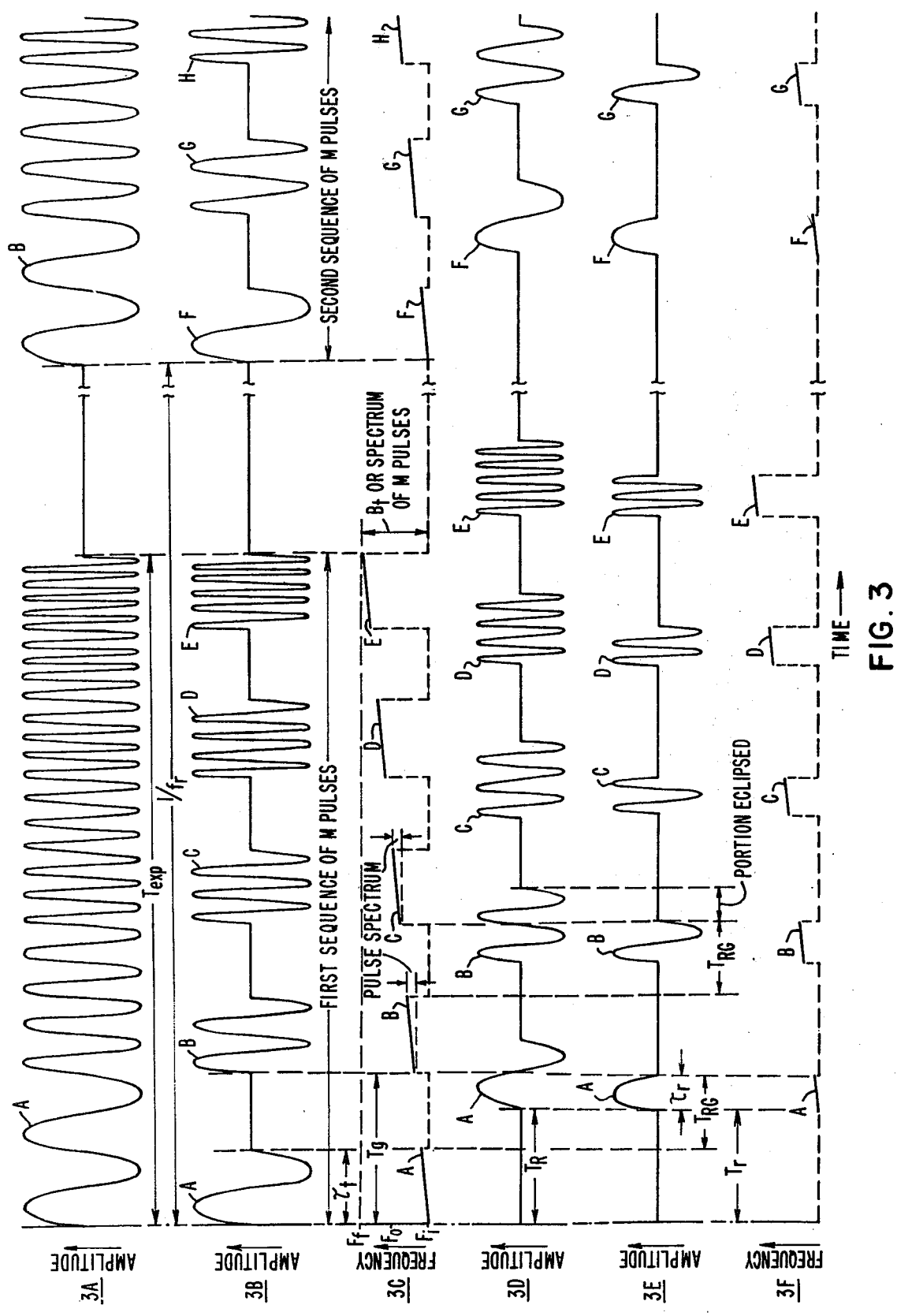

GATED PULSE COMPRESSION RADAR

BACKGROUND OF THE INVENTION

1. Field of the Invention

This invention relates to radar, particularly to pulse compression radar.

2. Description of the Prior Art

In the prior art, radar systems are often required to operate at more than one transmit duty cycle in order to provide more nearly optimum performance under variant conditions and missions. At high transmit duty cycles, low peak power is desired from the transmitter. At low transmit duty cycles, high peak power is desired from the transmitter. If comparable range performance is needed from the radar system in both the high and low transmit duty cycle mode using the same transmitter, some form of pulse compression may be used for the low transmit duty cycle mode to lengthen the transmitted signal and thereby raise the average power directed at the target. Unfortunately, conventional pulse compression systems require transmitting for a comparatively long period of time during which the receiver is turned off. Present pulse compression radar systems have two undesirable effects due to the receiver being turned off for a long period of time. The first is the inability of the radar to detect targets at close range and the second is only a portion of the transmitted pulse may be received causing pulse distortion and time sidelobes due to the fact that the receiver is turned off when transmitting. In other words, the target reflected signal is eclipsed or truncated.

In the operation of a conventional pulse compression radar, a linear FM waveform is transmitted for a period of time, $T_{expanded}$. During $T_{expanded}$, the carrier frequency of the transmitter is varied linearly over a frequency $B_t$, which defines the basic signal information bandwidth. When a target reflected echo is received, the signal is processed through a matched filter which compresses the target reflected pulse to a width of $T_{compressed}$. The target reflected pulse may be compressed up to $1/B_t$. To minimize time sidelobes, a frequency weighting function is incorporated as part of the pulse compression circuit or matched filter. The output of the pulse compression circuit is a narrow pulse with a peak amplitude increased over the input pulse amplitude by approximately the compression ratio, $T_{expanded}/T_{compressed}$. The compression ratio may also be expressed as the product of $T_{expanded}$ and $B_t$ which is also known as the radar system time bandwidth product. For a given noise bandwidth, the signal-to-noise ratio for the radar system is increased by the compression ratio since more power is being directed towards the target. Furthermore, as stated above the basic range resolution of the radar system $T_{compressed}$, is determined by the bandwidth of the transmitted signal $B_t$.

In view of the prior art, it is therefore desirable to have a pulse compression radar which has a very short minimum range and permits the transmitter to operate at up to 50% duty cycle while maintaining excellent time sidelobes of the target reflected echoes despite eclipsing to provide increased radar range performance.

SUMMARY OF THE INVENTION

In accordance with the present invention, a method and apparatus is provided for obtaining target information by generating a sequence of M spaced apart pulses, the sequence having a predetermined duration, each of the pulses having a predetermined spectrum, the spaced apart pulses in the sequence occurring at a frequency greater than the bandwidth of the spectrum of M pulses, transmitting the sequence of M spaced apart pulses, receiving at least a portion of target reflected pulses of the sequence, and, generating selected target information in response to said portion of received target reflected pulses.

BRIEF DESCRIPTION OF THE DRAWINGS

FIGS. 3A through 3F show the signal or spectral waveforms at various points for the proper operation of the embodiment of FIG. 1;

DESCRIPTION OF THE PREFERRED EMBODIMENTS

Figure 1:
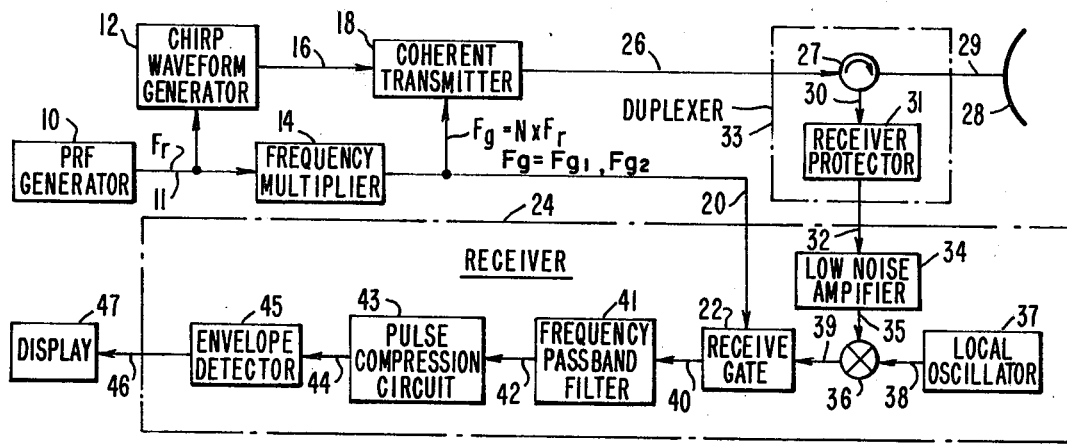
FIG. 1 is a block diagram of one embodiment of the invention.

Referring to FIG. 1, PRF generator 10 is coupled over line 11 to an input of chirp waveform generator 12 and an input of frequency synthesizer multiplier 14. PRF generator 10 functions to provide the sequence repetition rate of a sequence of spaced apart pulses. PRF generator 10, for example, initiates the start of each sequence of spaced apart pulses as shown in FIG. 3B. Chirp waveform generator 12 functions to generate a pulse compression waveform such as a linear FM signal as shown in FIG. 3A. Chirp waveform generator 12 may, for example, generate a waveform having an initial frequency which is increased linearly with respect to time for a predetermined duration and having a final frequency at the end of the waveform. The difference between the initial frequency and the final frequency of the pulse compression waveform from chirp waveform generator 12 represents the bandwidth, $B_t$, of the transmitted signal. Chirp waveform generator 12 may include, for example, a stable local oscillator (STALO), an FM ramp sequence generator and a single sideband mixer to mix the stalo signal and the FM ramp signal to generate the chirp or FM waveform. Alternatively chirp waveform generator 12 may include, for example, an FM ramp sequence generator which generates a voltage ramp for driving a frequency modulator which in turn modifies the carrier frequency of a carrier frequency generator to provide a linear FM waveform.

The output of chirp waveform generator 12 is coupled over line 16 to an input of coherent transmitter 18. Frequency multiplier 14 functions to provide an output signal, $F_g$, which is a multiple, such as an integer N, of the input signal, $F_r$. The value of integer N may be varied between several values. The output of PRF generator 10 has a frequency, $F_r$, which is multiplied by integer N in frequency synthesizer multiplier 14 to provide an output signal on line 20, $F_g$, which is coupled to a control input of coherent transmitter 18 and to the control input of receive gate 22 located in receiver 24. Coherent transmitter 18 functions to amplify the chirp waveform from chirp waveform generator 12 as a final amplifier and coherent transmitter 18 is turned on and off at the frequency $F_g$ on line 20. The result of turning on and off coherent transmitter 18 by its control input on line 20 is to provide an output signal on line 26 composed of spaced apart portions of a pulse compression waveform, each portion having a predetermined spectrum. An example of an output waveform on line 26 is shown in FIG. 3B and 3C which shows a sequence of M spaced apart pulses having a predetermined duration $T_{exp}$ and bandwidth $B_t$ comprised of the spectrum of M pulses. By adjusting the integer N of frequency multiplier 14 the gating frequency of coherent transmitter 18, $F_g$, may be equal to or greater than the information bandwidth $B_t$ of the pulse compression waveform on line 16 from chirp waveform generator 12 or of the sequence of spaced apart pulses on line 26.

Line 26 is coupled to an input of circulator 27 which couples the sequence of spaced apart pulses to antenna 28 over line 29. Antenna 28 functions to direct electromagnetic signal power into space or towards the ground. Antenna 28 may for example direct signal power towards a target and receive target reflected signals from the target. The signal radiated or transmitted by antenna 28 would be the sequence of spaced apart pulses with the sequence reoccurring at a frequency $F_r$ and the pulses of each sequence having a reoccurrence frequency of $F_g$. Target reflected signals received by antenna 28 are coupled over line 29 to circulator 27 which couples the signals over line 30 through receiver protector 31 and over line 32 to an input of receiver 24. Circulator 27 and receiver protector 31 are conventional in the art and function together as duplexer 33. Receiver protector 31 functions to prevent damage to receiver 24 by preventing or blocking the transmitted sequence of spaced apart pulses from entering receiver 24.

Figure 4:
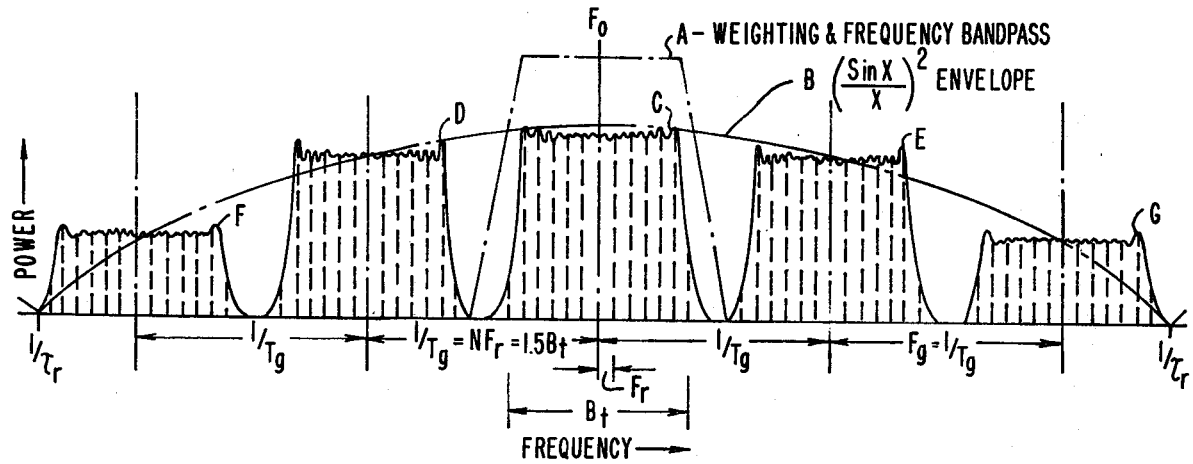
FIG. 4 shows the spectral waveform of the received signal in the embodiment of FIG. 1 before the signal is filtered.
Figure 6:
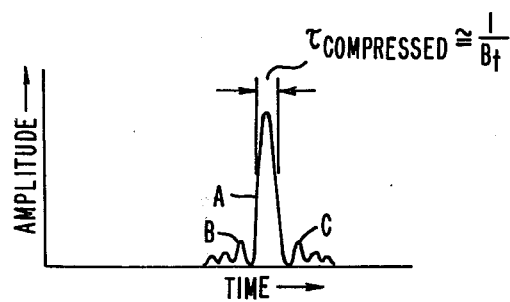
FIG. 6 shows the signal waveform in the embodiment of FIG. 1 after the received signal has passed through the pulse compression circuit.

Target reflected pulses as shown in FIG. 3D are coupled over line 32 to an input of low noise amplifier 34 in receiver 24. Low noise amplifier 34 functions to amplify the target reflected pulses and provides an output on line 35 to an input of mixer 36. Local oscillator 37 is coupled over line 38 to a second input of mixer 36. Mixer 36 functions to mix the target reflected pulses on line 35 with the frequency signal from local oscillator 37 to provide an output on line 39 containing the target reflected pulses at a first intermediate frequency (IF). Local oscillator 37 may for example have a frequency equal to the initial frequency of the first pulse of the sequence of pulses plus the frequency of the main beam clutter (ground return) minus the desired intermediate frequency out of mixer 36. The output of mixer 36 is coupled over line 39 to an input of receive gate 22. Receive gate 22 functions to be switched on and off and to shape the rise and fall time of the edges (leading and trailing) of the received target reflected pulses of the sequence. Receive gate 22 is turned on under the control of the signal on line 20, $F_g$, when coherent transmitter 18 is not on or transmitting. Receive gate 22 continues to be turned on and off at the frequency, $F_g$, after the sequence of spaced apart pulses is transmitted by coherent transmitter 18 to provide a uniform eclipsing factor to the entire length of a received sequence of pulses or echoes, regardless of the time of arrival at antenna 28. By continuing the gating action of the receive gate 22 beyond the transmit time, all portions of the sequence of target reflected pulses have the same effective receive duty cycle $D_r$ as shown in FIGS. 3E and 3F. Under these conditions, eclipsing affects only the spectral amplitude and not the chirp bandwidth. Target reflected pulses or the portions that pass through receive gate 22 are coupled over line 40 to an input of frequency pass band filter 41. An example of the frequency spectrum distribution of a typical sequence of target reflected pulses on line 40 is shown in FIG. 4 which will be described in more detail later. Frequency band pass filter 41 should have a band pass sufficient to pass the bandwidth of the transmitted signal and centered about the center frequency of the transmitted sequence of spaced apart pulses. Curve A in FIG. 4 delineates a typical pass band spectrum to extract predetermined frequency components from the received target reflected pulses. The output of frequency pass band filter 41 is coupled over line 42 to pulse compression circuit 43. Pulse compression circuit 43 functions to compress the target reflected pulses that pass through frequency pass band filter 41 to a single pulse having a peak amplitude and time sidelobes. An example of the output of a pulse compression circuit is shown in FIG. 6 having a pulse with a peak amplitude denoted by curve A and lower and upper time sidelobes represented by curves B and C respectively. The width of curve A in FIG. 6 is proportional to $1/B_t$, where $B_t$ is the bandwidth of the transmitted waveform. The output of pulse compression circuit 43 is coupled over line 44 to additional signal processing circuitry such as envelope detector 45 to utilize the output of pulse compression circuit 43 in a conventional manner. Envelope detector 45 would for example provide an output over line 46 to display 47. Display 47 would function to display target information such as a blip or spot on a cathode ray tube to show range and azimuth.

Figure 2A:
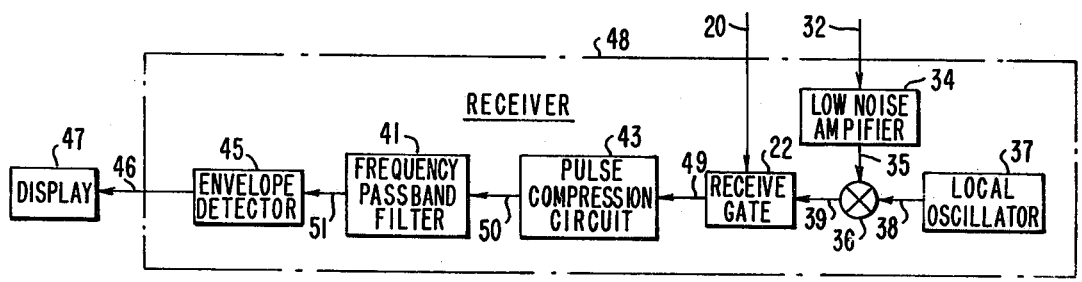
FIG. 2A shows an alternate embodiment of the receiver as shown in FIG. 1.

FIG. 2A shows an alternate embodiment of the receiver 24 shown in FIG. 1 wherein like references are used for functions corresponding to the apparatus of FIG. 1. In receiver 48 of FIG. 2A the positions of pulse compression circuit 43 and frequency pass band filter 41 are interchanged. In receiver 48, the output of receive gate 22 is coupled over line 49 to an input of pulse compression circuit 43. The output of pulse compression circuit 43 is coupled over line 50 to an input of frequency pass band filter 41. The output of frequency pass band filter 41 is coupled over line 51 to an input of envelope detector 45. The alternate configuration in receiver 48 demonstrates that for a sequence of spaced apart pulses derived from a linear FM signal, the pulse compression circuit 43 may precede the frequency pass band filter 41. The output on line 44 of receiver 24 in FIG. 1 and the output on line 51 of receiver 48 are essentially the same.

Figure 2B:
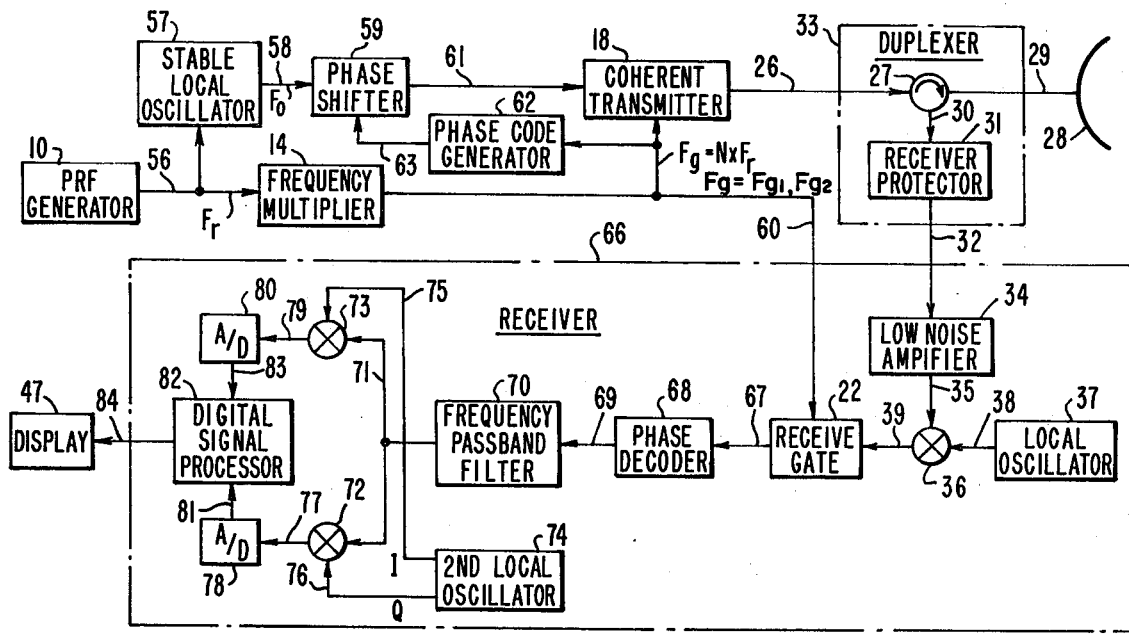
FIG. 2B shows an alternate embodiment of the invention utilizing a binary phase code.

FIG. 2B shows an alternate embodiment of the embodiment of FIG. 1 wherein like references are used for functions corresponding to the apparatus of FIG. 1. FIG. 2B shows the arrangement of hardware where a binary phase code is used as the pulse compression waveform instead of the chirp waveform used in FIG. 1. In FIG. 2B, PRF generator 10 is coupled over line 56 to an input of stable local oscillator 57 and to an input of frequency multiplier 14. Stable local oscillator 57 generates a carrier frequency for a fixed duration in response to a signal over line 56. The output of stable local oscillator 57 is coupled over line 58 to phase shifter 59. Frequency multiplier 14 is coupled over line 60 to the control input of phase code generator 62, the control input of coherent transmitter 18 and the control input of receive gate 22. Frequency multiplier 14 functions to multiply the signal $F_r$ out of PRF generator 10 by an integer N to provide a frequency $F_g$. Phase code generator 62 has an output coupled over line 63 to the control input of phase shifter 59 to provide a binary phase code to phase shifter 59 at the frequency $F_g$ or less. Phase shifter 59 provides a phase shift to the carrier frequency from stable local oscillator 57 at the rate of the binary phase code on line 63. Phase shifter 59 may shift the phase of the carrier frequency from stable local oscillator 57 by a predetermined amount such as 180°. Other non-binary codes can be applied in a similar manner. The output of phase shifter 59 is coupled over line 61 to an input of coherent transmitter 18. Coherent transmitter 18 is turned on and off at the frequency $F_g$ such that a sequence of spaced apart pulses is formed. The sequence of spaced apart pulses are transmitted and a sequence of target reflected pulses are received in receiver 66 over line 32. The output of receive gate 22 is coupled over line 67 to an input of phase decoder 68. Phase decoder 68 functions to compress the binary phase code on the received sequence and to provide an output signal over line 69 to frequency pass band filter 70. Frequency pass band filter 70 has a center frequency on the carrier frequency of the stable local oscillator 57 taking into account the shift of frequency due to mixer 36. The bandwidth of frequency pass band filter 70 should exceed the bandwidth $B_t$ of the sequence of spaced apart pulses which is the bandwidth of the phase code impressed upon the carrier frequency. The output of frequency pass band filter 70 is coupled over line 71 to an input of mixer 72 and an input of mixer 73. Second local oscillator 74 provides a frequency signal in phase on line 75 to an input of mixer 73 and in quadrature over line 76 to an input of mixer 72. The output of mixer 72 is coupled over line 77 to an input of analog-to-digital converter 78. The output of mixer 73 is coupled over line 79 to an input of analog-to-digital (A/D) converter 80. The output of analog-to-digital converter 78 is coupled over line 81 to an input of digital signal processor 82. The output of analog-to-digital converter 80 is coupled over line 83 to an input of digital signal processor 82. Second local oscillator 74, mixers 72 and 73, A/D converters 78 and 80 and digital signal processor 82 represents conventional apparatus for processing the output signal from frequency pass band filter 70 and may for example function as an envelope detector 45 or in fact be replaced with envelope detector 45. The output of digital signal processor 82 is coupled over line 84 to display 47. Digital signal processor 82 functions to extract pertinent target information from the output of frequency pass band filter 70 in the conventional manner. Alternate analog means which is conventional in the art may be utilized to extract target information from the output of frequency pass band filter 70.

Referring now to FIG. 3A a typical waveform of the output of chirp waveform generator 12 of FIG. 1 is shown. In FIG. 3A the ordinate represents amplitude and the abscissa represents time. Each of curves A and B represent a linear FM signal with increasing frequency for a predetermined duration $T_{exp}$ and having a predetermined bandwidth $B_t$. The waveforms of curve A and B were initiated in generator 12 upon a signal $F_r$ from PRF generator 10. The waveform of curve A of FIG. 3A is fed into coherent transmitter 18 where the waveform is gated by signal $F_g$ which is a multiple of the frequency $F_r$ of the PRF generator 10.

FIG. 3B shows a sequence of spaced apart pulses represented by waveforms A, B, C, D and E which were formed by gating on and off coherent transmitter 18 as waveform A of FIG. 3A was being transmitted. Waveforms F, G and H of FIG. 3B represent the output signal of coherent transmitter 18 due to the gating action at frequency $F_g$ when waveform B as shown in FIG. 3A was at its input, which corresponds to the next transmission sequence occurring at a radar repetition frequency $F_r$. In FIG. 3B the ordinate represents amplitude and the abscissa represents time. The time between successive pulses in a sequence is represented by $T_g$ which is equal to $1/F_g$ and the duration of a single pulse in a sequence of spaced apart pulses is represented by $\tau_t$; both of which are shown in FIG. 3B. The frequency or spectrum of each pulse in FIG. 3B as a function of time is shown in FIG. 3C where the ordinate represents frequency and the abscissa represents time. The sequence of spaced apart pulses A, B, C, D and E and a subsequent portion of a sequence, pulses F, G, and H, of FIG. 3B are radiated by antenna 28 towards a target at the speed of light.

A portion of the radiated signal is reflected from the target and received at a later time $T_r$ at antenna 28 as shown in FIG. 3D. The received target reflected pulses are passed through duplexer 33 to receiver 24. Waveforms A, B, C, D and E of FIG. 3D represent the target reflected pulses which are delayed in time $T_r$ from the transmitted sequence of spaced apart pulses A, B, C, D and E of FIG. 3B. Waveforms F and G are delayed in time $T_r$ from pulses F and G of FIG. 3B. In FIG. 3D the ordinate represents amplitude and the abscissa represents time. The target reflected pulses pass through mixer 36 to the input of receive gate 22. If the time of arrival of the sequence of target reflected pulses occurs early or late with the respect to the on time of receive gate 22; then, a portion of the target reflected pulses will be eclipsed by receive gate 22. The portion of each pulse that passes through receive gate 22 is fed to frequency pass band filter 41. In FIG. 3E curves A, B, C, D and E show an example of a sequence of spaced apart pulses which arrive slightly late with respect to the on time of receive gate 22 $T_{rg}$ and hence only the first portion of each pulse passes through receiver 22. Curves F and G are from a subsequent sequence and show the same thing. The portion of each pulse that does pass through receive gate 22 has a time width of $\tau_r$ as shown in FIG. 3E. In FIG. 3E the ordinate represents amplitude and the abscissa represents time. In FIG. 3F curves A, B, C, D, E, F, and G show the frequency of each pulse or the portion that passes through receive gate 22. In FIG. 3F the ordinate represents frequency and the abscissa represents time.

FIG. 4 shows the frequency or spectrum distribution at the output of receive gate 22 of a sequence of spaced apart pulses, each pulse having a portion eclipsed as shown in FIGS. 3E and 3F. In FIG. 4 the ordinate represents power and the abscissa represents frequency.

If a linear FM waveform was transmitted and received, the spectrum distribution in the receiver may be described by the well known Fresnel integral function with the major portion of the spectral power being contained within a bandwidth, $B_t$; $B_t$ is equal to the FM deviation of the linear FM waveform. The spectral power outside of the bandwidth, $B_t$, falls off very rapidly.

If a rectangular gating function such as a series of square waves of a carrier frequency $F_o$ are transmitted and received, the amplitude spectrum in the receiver may be described by the familiar sin X/X spectrum with a peak amplitude at $F_o$ and where the first null points of the sidelobes occur at the frequency $1/\tau$ away from $F_o$ where $\tau$ is the width of the square wave of the transmitted pulse. The power spectrum may be represented by (sin X/X)$^2$.

In FIG. 4 the spectrum distribution is the convolution of the gating spectrum and the linear FM spectrum. Curve B delineates the power spectrum resulting from the gating action of (sin X/X)$^2$ where X represents the time width of each received pulse, $\tau_r$, on line 40 of FIG. 1. The first null points occur at $1/\tau_r$. The peak amplitude of the power spectrum due to gating is shown in curve B at the point $F_O$ as $(\tau_r/T_g)^2$ where $T_g$ is the time between consecutive pulses in a sequence of pulses. The ratio $\tau_r/T_g$ may also be described as the duty cycle of the received target reflected pulses. Curve C represents the envelope due to the contribution of the linear FM frequency components in the sequence of spaced apart pulses. The width of envelope C is the bandwidth, $B_t$ of the linear FM waveform. Within envelope C are a number of spectral lines each spaced apart from one another by the frequency of PRF generator 10 in FIG. 1. $F_r$ envelopes D and E are spaced apart from the center frequency, $F_o$ by an amount $1/T_g$. Envelopes F and G are spaced apart from the center frequency $F_o$ by an amount $2/T_g$. Within envelopes D, E, F and G are spectral lines spaced apart from one another by the frequency $F_r$.

In FIG. 4, curve A represents a frequency weighting and pass band filter response used in conventional chirp receivers to reduce time sidelobes. If the spectrum of FIG. 4 underneath curve A is extracted such as by frequency pass band filter 41 in FIG. 1 and the desired weighting is applied to the "central spectral line" Fresnel spectrum, the frequency components associated with other lines due to the gating action are removed or greatly attenuated and in practice, negligible. Thus with adequate spectral separation of envelopes D and E from envelope C, the output of frequency pass band filter 42 with a gated input such as a sequence of spaced apart pulses is virtually identical to a conventional linear FM signal of similar duration and signal bandwidth (except for an amplitude scaling factor).

Pulse compression circuit 43 in FIG. 1 compresses the output of the frequency pass band filter 41 with a conventional pulse compression circuit to provide an output pulse on line 44 such as shown by curves A, B and C in FIG. 6.

As shown in FIG. 4, the information in the ungated linear FM waveform from chirp waveform generator 12 can be recovered from the gated signal, the output of coherent transmitter 18, by having the gating frequency $F_g$ above such as 1.5 times above the information bandwidth of the system, the bandwidth $B_t$ of the linear FM waveform. The information can be recovered if the gating frequency $F_g$ is such that the envelopes D and E of FIG. 4 do not overlap any portion of envelope C. The larger the gating frequency $F_g$ or $1/T_g$ the further the frequency separation of envelopes D and E from envelope C.

Figure 5:
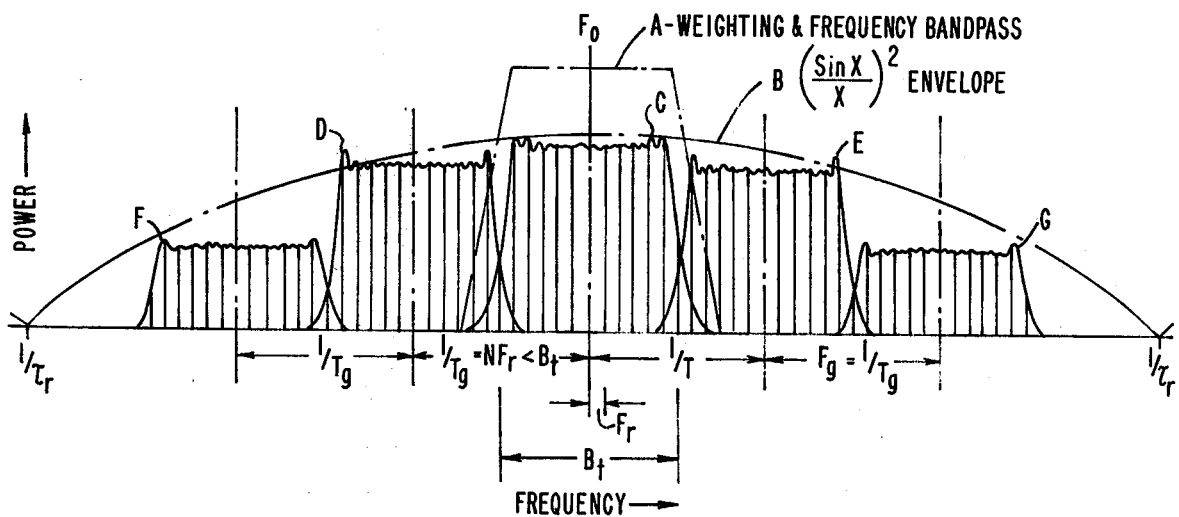
FIG. 5 shows the spectral waveform of the received signal where the gating frequency is too low with respect to the bandwidth of the transmitted signal.

FIG. 5 shows the spectrum on line 40 of FIG. 1 where the gating frequency $F_g$ is low or below the bandwidth $B_t$ of the linear FM waveform from chirp waveform generator 12. As can be seen in FIG. 5 a frequency pass band filter would be unable to extract the "central spectral line" Fresnel spectrum of envelope C without including a portion of the power spectrum underneath envelopes D and C. The result is that the pulse compression circuit 43 will provide a degraded output signal with the peak amplitude reduced and the amplitude of the time sidelobes B and C increased over what is shown in FIG. 6.

FIG. 6 shows the output of a pulse compression circuit 43 having a peak amplitude curve A and time sidelobes B and C. In FIG. 6 the ordinate represents amplitude and the abscissa represents time. The width of curve A represents $\tau_{comp}$ with is equal to $1/B_t$. FIG. 6 also represents a compressed waveform for various binary phase codes or other waveform amenable to pulse compression. By using a gated waveform or chirp such as shown in FIG. 3B, the transmitter is only on for pulses $\tau_t$ wide and the receiver is on during the remaining period of the gating cycle, $T_g$. It thus becomes possible for a target reflected signal to be received during the time another signal is being transmitted such that one signal can be compressed in the receiver while another is being sent out by the transmitter. This enables the minimum range of such a system to be a small fraction of the total transmitted pulse length, $T_{exp}$, and thus removes the restriction on the allowable length of the transmitted pulse, $T_{exp}$.

In the operation of the embodiment in FIG. 1, receive target reflected pulses may not line up with receive gate 22. At times the target reflected pulses such as shown in FIG. 3D may align up exactly with receive gate 22 allowing the maximum signal through receive gate 22 and at other times the target reflect pulses may arrive when the receive gate 22 is off which results in no signal passing through receive gate 22. If the target reflected pulses are uniformly moved or shifted from one extreme to the other at receive gate 22, an average signal level will pass through receive gate 22 which can then be introduced into system performance calculations by means of an average eclipsing loss factor. The time of arrival of target reflected pulses at receive gate 22 when receive gate is on may be varied by switching the gating frequency $F_g$ between several selected values. The gating frequency $F_g$ may be varied between selected values by alternately selecting various integer values N within frequency synthesizer or multiplier 14. Of course the gating frequency $F_g$ should be equal to or exceed the bandwidth, $B_t$, of the spectrum of the pulses of a sequence or of the pulse compression waveform from chirp waveform generator 12 to maintain separation between envelopes D and C and C and E in FIG. 4. Gating frequency $F_g$ may be compared with a sampling frequency which if it is above the nyquist rate (twice the information bandwidth) all of the information in the pulse compression waveform is retained. As can be seen in FIG. 4 the power level of the sequence of target reflected pulses will fluctuate according to how much of the individual pulses pass through receive gate 22 at any one time. Thus, for several values of the gating frequency, $F_g$, the amount of signal which passes through receive gate 22 expressed in time as $\tau_r$ shown in FIG. 3E, will have several values. The power level of the sequence of target reflected pulses may then be expressed as $(\tau_r/T_g)^2$. Thus for several values of $\tau_r$ with $T_g$ being modified slightly the power of the sequence of spaced apart pulses may be averaged over time. The variation of the gating frequency, $F_g$, assures that only an average loss is incurred in signal power and avoids the often objectionable scan-to-scan target eclipse dropout characteristic of high duty cycle operation with a single 50% duty cycle waveform. With a 50% duty cycle waveform the average signal-to-noise power loss in the sequence of target reflected pulses is about 5 decibels.

As shown in FIG. 1 the gating frequency, $F_g$, over line 20 continually turns on and off receive gate 22. Receive gate 22 is turned on and off beyond the transmit time $T_{exp}$. By operating the receive gate 22 beyond the transmit time $T_{exp}$, a uniform eclipsing factor may be applied to the entire sequence of target reflected pulses, regardless of its relative time delay $T_r$ as shown in FIG. 3E. The result is that all pulses of the sequence of target reflected pulses have the same effective receive time, $\tau_r$, and duty cycle $D_r$ which is equal to $\tau_r/T_g$. Hence eclipsing by the receive gate 22 affects only the power or amplitude of the central spectral line as shown in FIG. 4 and not the chirp bandwidth, $B_t$. In a conventional pulse compression system, such as one using linear FM, a complete portion of the expanded or transmitted pulse waveform is gated out by eclipsing at the receiver, resulting in severe pulse distortion and a large increase in the amplitude of the time sidelobes such as curves B and C in FIG. 6 after compressing the target reflected signal.

Figure 7:
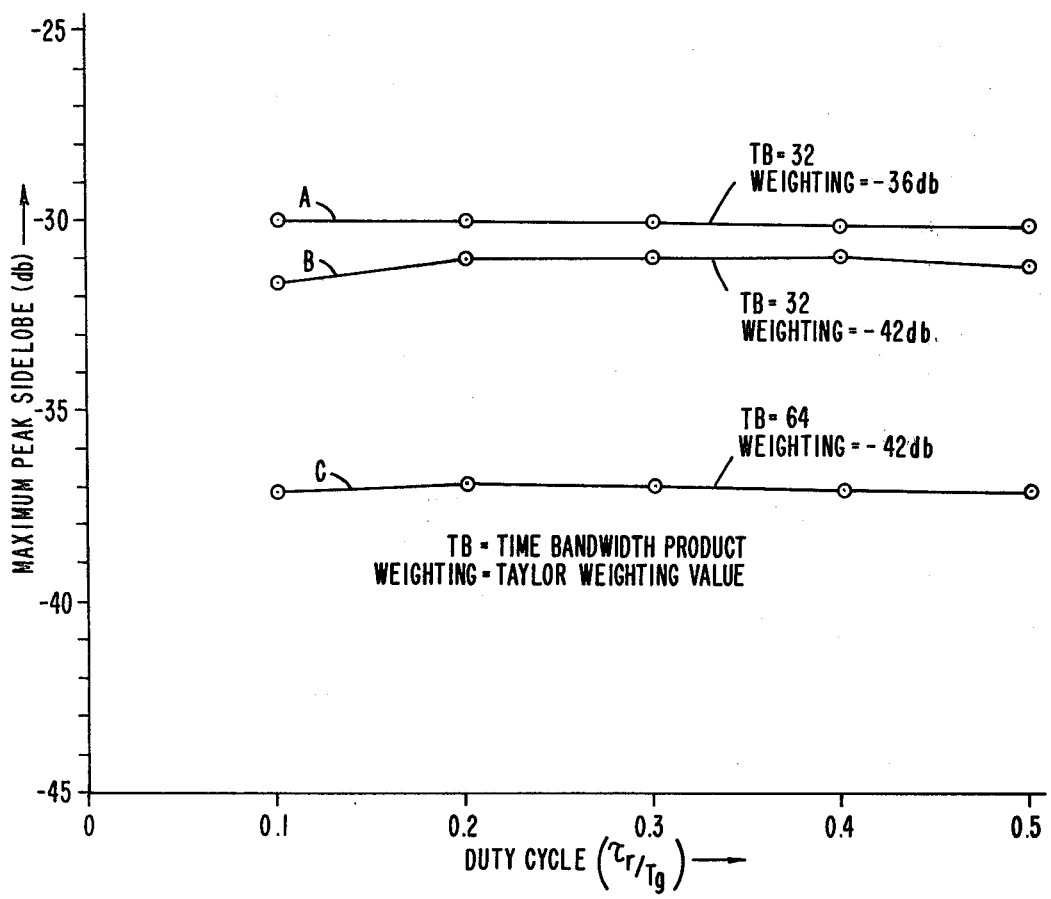
FIG. 7 shows the affect of gating or duty cycle of the transmitted signal with respect to the time sidelobes of the received signal after filtering and compressing.

The effect of gating the transmitted waveform and the receive gate at a frequency $F_g$, on the time sidelobes of the compressed signal such as shown by curves B and C in FIG. 6 are shown in FIG. 7. In FIG. 7, the ordinate represents the maximum peak of the sidelobe in decibels with respect to the peak amplitude such as curve A in FIG. 6. The abscissa represents duty cycle, $\tau_r/T_g$. Curves A, B and C show the peak sidelobe versus duty cycle for a received sequence of target reflected pulses. For curves A, B and C, the transmitted sequence has a predetermined spectrum bandwidth, $B_t$, suitable for pulse compression which has been gated on and off or wherein the pulses are spaced at a frequency $F_g$. For curves A, B and C the bandwidth $B_t$ equals the gating frequency $F_g$. For curves A and B the time duration of the sequence of spaced apart pulses $T_{exp}$ multiplied times the bandwidth $B_t$ equals 32 which is also known as the time bandwidth product. For curve C the time bandwidth product is 64. Curves A, B and C utilize a Taylor weighting value for the edges of frequency pass band filter 41. For curve A the Taylor weighting value is minus 36 decibels. For curve B and Taylor weighting value is minus 42 decibels and for curve C 42 decibels. Curves A, B and C show that little degradation occurs in the sidelobe levels due to gating or eclipsing of the target reflected pulses of a sequence as long as the gating frequency $F_g$, is made equal to or greater than the bandwidth $B_t$, of the pulse compression waveform from chirp waveform generator 12.

In operation of the embodiment of FIG. 2A, a sequence of target reflected pulses are passed through receive gate 22 to pulse compression circuit 43 which is conventional in the art for compressing the linear FM waveform generated by chirp waveform generator 12. The output of pulse compression circuit 43 is coupled over line 50 to frequency pass band filter 41. The output of frequency pass band filter 41 has a frequency pass band as shown by curve A in FIG. 4. The output of frequency pass band filter 41 is the pulse compression waveform of FIG. 6 having a peak amplitude shown by curve A and time sidelobes shown by curves B and C. The output on line 51 is the compression of the sequence of spaced apart pulses transmitted by coherent transmitter 18.

In the operation of the embodiment shown in FIG. 2B stable local oscillator 57 provides a carrier frequency $F_o$ to phase shifter 59 which varies the phase of the carrier frequency $F_o$ under the control of phase code generator 62 which impresses on the carrier frequency a phase code which subsequently may be compressed in receiver 66. The output of phase shifter 59 is fed to coherent transmitter 18 which amplifies the signal. Coherent transmitter 18 is turned on and off at a gating frequency, $F_g$, where $F_g$ exceed the bandwidth of the phase code. The output of coherent transmitter 18 is a sequence of M spaced apart pulses having a phase code spectrum of a predetermined bandwidth. The pulses are radiated by antenna 28 and target reflected pulses of the sequence are received by antenna 28 and passed through mixer 36 and receive gate 22. Phase decoder 68 decodes the received phase coded signal impressed upon the sequence of M spaced apart pulses. Phase coder 68 is conventional in the art. Frequency pass band filter 70 passes the central spectral line. The output of frequency pass band filter 70 is the compressed signal generated by phase shifter 59 under the control of phase code generator 62. Frequency pass band filter 70 functions to eliminate any first and second gating spectral lines which are separated from the central spectral line by $F_g$ caused by the gating of the phase coded signal from phase shifter 59. At the output of frequency filter 70 it is conventional in the art to extract selected target information such as target amplitude, target doppler frequency in phase, target range, and target signature information just as though the original signal that was transmitted was a phase coded pulse compression waveform which was compressed in the receiver 66. Digital signal processor 82 and A to D converters 78 and 80 and mixers 72 and 73 provide a means for extracting information from the signal and displaying appropriate information on display 47.

Numerous other embodiments are possible. For example, phase decoder 66 and frequency band pass filter 70 can be eliminated and the receive sequence of M spaced apart pulses digitally encoded by operating A/D converters 78 and 80 each at a sampling frequency $F_g$. The digitally encoded sequences can then be compressed in conventional manners using well known digital techniques.

The invention provides a method and apparatus for operating a pulse compression coherent radar for obtaining target information by generating a sequence of M spaced apart pulses, the sequence having a predetermined duration, each of the pulses having a predetermined spectrum, these spaced apart pulses in the sequence occurring at a frequency greater than the bandwidth of the combined spectrum of M pulses, transmitting the sequence of spaced apart pulses, receiving at least a portion of target reflected pulses of the sequence, mixing the received target reflected pulses of the sequence with a local oscillator signal, shaping the rise and fall time of the edges of the receive target reflected pulses of the sequence, filtering the receive target reflected pulses of the sequence to extract predetermined frequency components and compressing the received target reflected pulses of the sequence to form an output signal containing target amplitude, target doppler frequency and phase, target range, and target signature information. Alternatively, the steps of filtering and compressing may be reversed in time. It is important to note that virtually all forms of conventional pulse compression are applicable to the herein described invention when suitable relationships are maintained between the pulse compression waveform bandwidth and the gating frequency.

I claim:

1. A method of operating a pulse compression coherent radar for obtaining target information comprising the steps of:

generating a plurality of sequences of spaced apart pulses, each said sequence having a predetermined duration and frequency bandwidth amenable to pulse compression, said spaced apart pulses in each of said sequences having a constant pulsewidth and pulse spacing to provide a fixed repetition rate for each of said sequences which is greater than said frequency bandwidth of said respective sequence of pulses, transmitting said plurality of sequences of spaced apart pulses, receiving a constant pulsewidth portion of each target reflected pulse of a sequence of pulses during time gated intervals of constant duration less than said pulse spacing and at said fixed repetition rate between transmitting each spaced apart pulse of a sequence and after transmitting a sequence to provide a uniform receive duty cycle to the entire length of a received sequence of pulses, compressing an entire length of a received sequence of target reflected pulses to generate target information.

2. The method of claim 1 wherein between the steps of receiving and compressing further including the step of filtering said received target reflected pulses of said sequence to extract predetermined frequency components.

3. The method of claim 1 wherein between the steps of receiving and compressing further including the steps of shaping the rise and fall time of the edges of said received target reflected pulses of said sequence and filtering said received target reflected pulses of said sequence to extract predetermined frequency components.

4. The method of claim 1 further including the step of filtering said received target reflected pulses of said sequence to extract predetermined frequency components.

5. The method of claim 1 wherein said step of receiving includes the step of:

mixing said received target reflected pulses of said sequence with a local oscillator signal.

6. A pulse compression coherent radar for transmitting signals and receiving target reflected signals for obtaining target information comprising:

means for generating a plurality of sequences of spaced apart pulses, each said sequence having a predetermined duration and frequency bandwidth, said spaced apart pulses in each of said sequences having a constant pulsewidth and pulse spacing to provide a fixed repetition rate for each of said sequences which is greater than said frequency bandwidth of said respective sequence of pulses, said pulses being composed of spaced apart portions of a pulse compression waveform, means for transmitting said plurality of sequences of spaced apart pulses, means for receiving a constant pulsewidth portion of each target reflected pulse of a sequence of pulses during time gated intervals of constant duration less than said pulse spacing and at said fixed repetition rate between transmitting each spaced apart pulse of a sequence and after transmitting a sequence to provide a uniform receive duty cycle to the entire length of a received sequence of pulses, and compressing an entire length of a received sequence of target reflected pulses to generate target information.

7. The pulse compression coherent radar of claim 6 further including:

means coupled to said means for receiving for filtering said received target reflected pulses of said sequence to extract predetermined frequency components.

8. The pulse compression coherent radar of claim 6 further including:

means coupled to said means for receiving for shaping the rise and fall time of the edges of said received target reflected pulses of said sequence and means for filtering said received target reflected pulses of said sequence to extract predetermined frequency components.

9. The pulse compression coherent radar of claim 6 wherein said means for receiving includes:

a local oscillator signal, and means for mixing said received target reflected pulses of said sequence with said local oscillator signal.

10. A method of operating a pulse compression coherent radar for obtaining target information comprising the steps of:

generating a plurality of pulse compression waveforms having a predetermined duration and frequency bandwidth, gating each of said pulse compression waveforms at a predetermined frequency which is greater than said frequency bandwidth to form a sequence of spaced apart pulses having constant pulse width and pulse spacing, transmitting said plurality of sequences of spaced apart pulses, receiving a constant pulsewidth portion of each target reflected pulse of a sequence of pulses during time gated intervals of constant duration less than said pulse spacing and at said predetermined frequency between transmitting each spaced apart pulse of a sequence and after transmitting a sequence to provide a uniform receive duty cycle to the entire length of a received sequence of pulses, and compressing an entire length of a received sequence of target reflected pulses to generate target information.

11. The method of claim 10 wherein said step of generating selected target information includes the steps of:

filtering said received target reflected pulses of said sequence to extract predetermined frequency components, and compressing said received target reflected pulses of said sequence.

12. The method of claim 10 wherein said step of generating a plurality of pulse compression waveforms includes the step of:
generating a linear FM waveform.

13. The method of claim 10 wherein said step of generating a plurality of pulse compression waveforms includes the step of:
generating a phase coded waveform.

14. The method of claim 10 wherein said step of gating includes the steps of:
gating at a first frequency greater than said bandwidth for a first time interval to receive the entire length of a target reflected sequence, and
gating at a second frequency greater than said bandwidth for a second time interval to receive the entire length of a target reflected sequence to provide an average eclipsing loss of a plurality of received target reflected sequences.

15. A pulse compression coherent radar for transmitting signals and receiving reflected signals for obtaining target information comprising:
means for generating a plurality of pulse compression waveforms having a predetermined duration and frequency bandwidth,
means for gating each of said pulse compression waveforms at a predetermined frequency which is greater than said frequency bandwidth to form a sequence of spaced apart pulses having constant pulsewidth and pulse spacing,
means for transmitting said plurality of sequences of spaced apart pulses,
means for receiving a constant pulsewidth portion of each target reflected pulse of a sequence of pulses during time gated intervals of constant duration less than said pulse spacing and at said predetermined frequency between transmitting each spaced apart pulse of a sequence and after transmitting a sequence to provide a uniform receive duty cycle to the entire length of a received sequence of pulses, and
means for compressing an entire length of a received sequence of target reflected pulses to generate target information.

16. The pulse compression coherent radar of claim 15 further including
means coupled to said means for receiving for filtering said received target reflected pulses of said sequence to extract predetermined frequency components.

17. The pulse compression coherent radar of claim 15 wherein said means for generating a plurality of pulse compression waveforms includes:
means for generating a linear FM waveform.

18. The pulse compression coherent radar of claim 15 wherein said means for generating a plurality of pulse compression waveforms includes:
means for generating a phase coded waveform.

* * * * *